United States Patent [19]

Nis et al.

[11] Patent Number: 4,477,244
[45] Date of Patent: Oct. 16, 1984

[54] TORCH

[75] Inventors: John R. Nis, Hamilton Township, Mercer County; Carroll D. Spainhour, Princeton Township, Mercer County, both of N.J.

[73] Assignee: AT&T Technologies, Inc., New York, N.Y.

[21] Appl. No.: 562,957

[22] Filed: Dec. 19, 1983

[51] Int. Cl.³ .............................................. F27D 3/00
[52] U.S. Cl. .................................. 432/11; 432/225; 239/132.3; 239/433; 239/552; 239/557; 239/568
[58] Field of Search ................. 431/8; 432/8, 11, 225; 239/3, 132.3, 418, 423, 429, 430, 433, 443, 449, 552, 554, 555, 557, 566, 567, 568

[56] References Cited

U.S. PATENT DOCUMENTS

| | | |
|---|---|---|
| 1,211,792 | 1/1917 | Von Boden et al. |
| 2,719,581 | 10/1955 | Greathead |
| 3,556,401 | 1/1971 | Hughes .................... 239/102 |
| 3,610,794 | 10/1971 | Adamski et al. ............ 431/354 |
| 3,843,057 | 10/1974 | Geiszler et al. ............ 239/132.3 |
| 4,217,027 | 8/1980 | MacChesney et al. ........ 350/96.3 |
| 4,231,777 | 11/1980 | Lynch et al. .............. 65/109 |
| 4,401,267 | 8/1983 | Spainhour ................. 239/132.3 |

FOREIGN PATENT DOCUMENTS

| | | |
|---|---|---|
| 469350 | 11/1950 | Canada ..................... 239/132.3 |
| 855909 | 12/1960 | United Kingdom . |

OTHER PUBLICATIONS

Brochure from Whale Apparatus Company, 400 Front Street, P. O. Box D, Hellertown, Pa. 18055, (No date given), 6 pages, Shows Torches for Lightguide Preforms.

*Primary Examiner*—Carroll B. Dority, Jr.
*Attorney, Agent, or Firm*—D. J. Kirk; R. B. Levy

[57] ABSTRACT

This disclosure is directed to an oxy-hydrogen torch (10) comprised of a plate (16) captured between first and second outer members (12 and 14). Each outer member has a plenum (18) which open towards, and is separated by, the plate (16). The plate (16) has a plurality of groups (29, 30, 31) of spaced grooves (32—32) in one major surface (34). The groups of grooves (32—32) are arranged in an interleaved relationship with groups (29', 30', 31') of spaced grooves (36—36) on the opposite surface (38). The grooves (32 and 36) extend from one surface 46 of the plate (16) to the respective plenums (18—18) in the outer members (12 and 14). Each of the grooves (32 and 36) in a group are radially directed at a different point. Oxygen is directed into one plenum (18) and hydrogen urged into the other plenum. The gases pass through the respective grooves (32 and 36) to the surface (46) of the torch (10) for mixing and ignition.

14 Claims, 8 Drawing Figures

TORCH

TECHNICAL FIELD

This invention is directed to a torch used to heat articles.

BACKGROUND OF THE INVENTION

One well known torch, which has been used to fabricate lightguide preforms is described in detail in U.S. Pat. No. 4,401,267 and is assigned to the instant assignee. That torch is comprised of an arcuate plate captured between first and second arcuate outer members, each outer member having a cavity therein which opens toward the plate. The plate has a plurality of uniformly spaced grooves on each major surface thereof, arranged in an interleaved relationship, the grooves extending from the respective cavities in the outer members to an outer edge of the plate to form a plurality of gas outlets. A first gas (e.g., oxygen) exits from alternate grooves at the outer edge while a second gas (e.g., hydrogen) exits from the remaining grooves. This torch has been found to be most effective in fabricating lightguide preforms. However, the arcuate shape and the radial grooves result in a flame build-up in the vicinity of the lightguide preform tube which provides a relative wide heat zone. Such a wide heat zone is desirable for fabricating lightguide preforms but presents problems when only a narrow portion of a tube or other article is to be heated. In some instances it is necessary to heat relatively narrow areas of the glass tube to selectively collapse portions of the tube.

Accordingly, there is a need for a torch which can provide a narrow heat zone and is relatively inexpensive and can be readily assembled or disassembled to repair.

SUMMARY OF THE INVENTION

The instant invention overcomes the foregoing problems with a torch comprised of an arcuate plate captured between first and second arcuate outer members, each outer member having a cavity therein which opens toward the plate. The plate has a plurality of arcuately spaced groups of grooves on each major surface thereof. The grooves extend from an edge thereof to the respective cavities in the outer members. Gases directed into the cavities exit through the respective grooves. Additionally, all the grooves in each group may be directed to a different point.

Such a torch provides a much narrower heat zone than was attainable with prior art torches using a grooved plate.

Advantageously, the instant torch is less expensive to fabricate than prior art designs.

A further advantage is that the instant torch may be easily and quickly repaired.

Additionally, the grooves in the plate may be machined to close tolerances resulting in uniform gas velocity therefrom.

DETAILED DESCRIPTION

The instant torch is described in relation to its use for heating glass tubes. However, such description is for purposes of exposition and not for limitation for the instant torch may be advantageously used to heat other articles which must be heated by a torch having a narrow heat zone.

Figure 1:
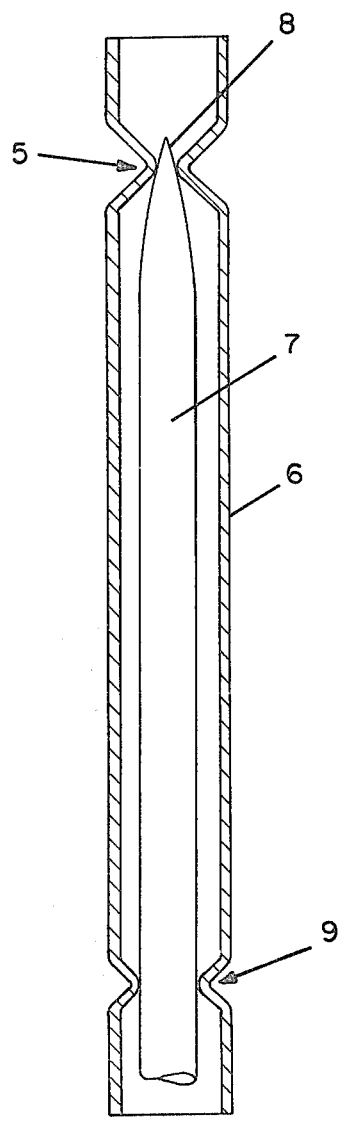
FIG. 1 shows a glass tube selectively collapsed onto an end of a lightguide preform.

In a well known technique (see FIG. 1) a narrow region 5 of a glass tube 6 is partially collapsed by selective heating. A lightguide preform 7 is then inserted into the tube 6 with an end 8 seated in the partially collapsed region 5. A crimp 9 is then formed in the tube 6 to hold the preform 7 in concentric, spaced relation to the inside surface of the tube 6. The narrow region 5 is then reheated to fully collapse it about the end 8 of the preform 7. The tube 6 with the preform 7 held therein may then be placed in a furnace or otherwise heated to collapse the tube on the preform. The torch described in U.S. Pat. No. 4,401,267 provides too large a heat zone to form such a narrow collapsed region 5 for the reasons hereinbefore set forth.

Figure 2:
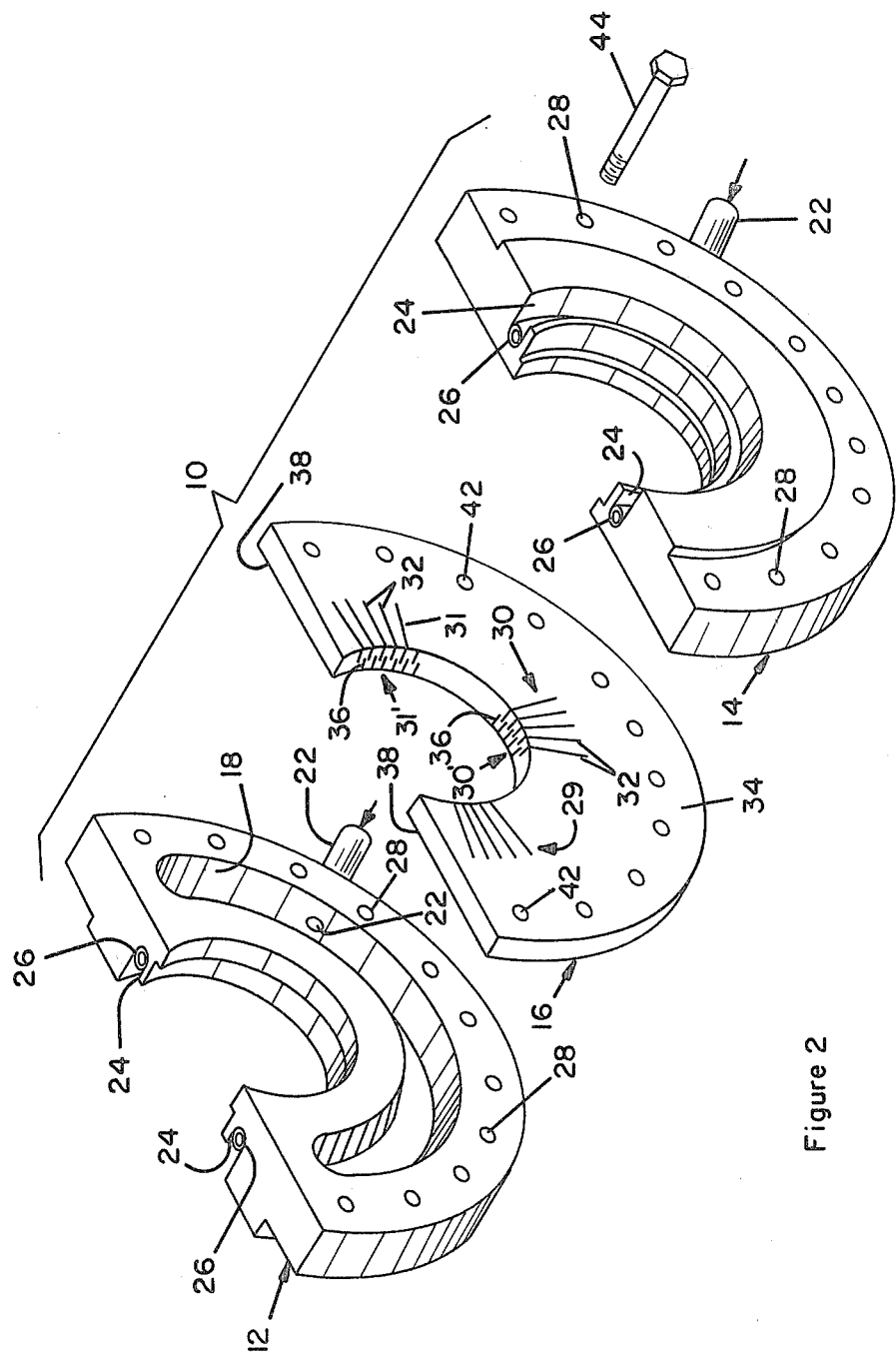
FIG. 2 is an exploded view of the instant torch.

The torch generally referred to by the numeral 10 in the exploded view shown in FIG. 2 overcomes the foregoing problem and is comprised of first and second identical outer members 12 and 14, respectively, and a nozzle plate 16, all having coextensive arcuate surfaces. The outer members 12 and 14 each have a "U" shaped plenum 18 and an input conduit 22 communicating therewith. The first and second outer members 12 and 14 each have an arcuate channel 24 having a cooling tube 26 pressed therein. A plurality of holes 28—28 pass through both members 12 and 14.

The nozzle plate 16 (see FIGS. 2 and 5) has a first plurality of groups 29, 30, 31 of radially disposed grooves 32—32 machined in a first major surface 34 and, as best seen in FIG. 2, a second plurality of groups 29', 30', 31' of radially disposed grooves 36—36 machined in a second major surface 38. The plate 16 has a plurality of holes 42—42 therethrough.

Figure 3:
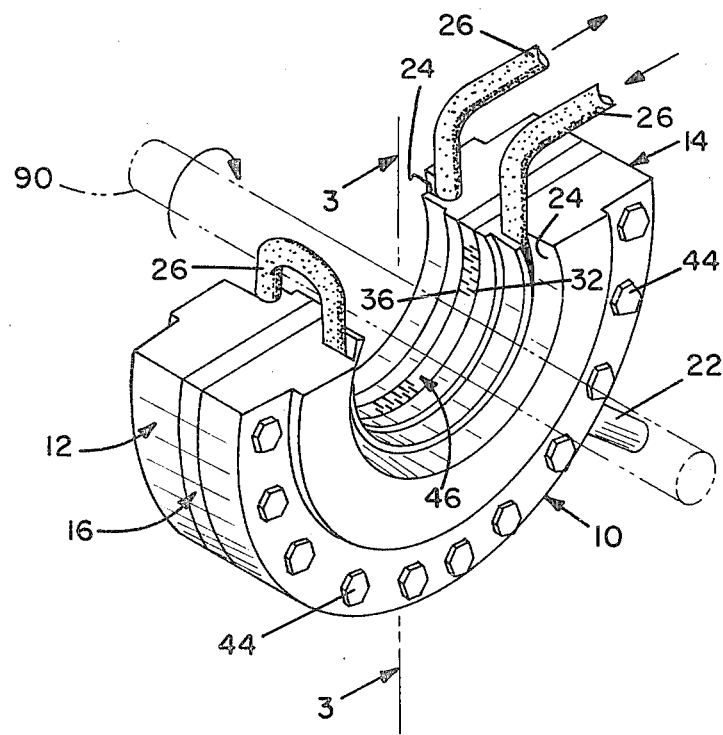
FIG. 3 shows the torch assembled and in position to selectively heat a portion of a glass tube.

FIG. 3 is an isometric view of the torch 10 which is assembled by capturing the planar nozzle plate 16 between the outer members 12 and 14 and securing the component parts together with a plurality of bolts 44—44 which pass through the holes 28 and 42. In the exemplary embodiment the outer members 12 and 14 were made of aluminum while the plate 16 and the tubing 26 where made of stainless steel.

Figure 4:
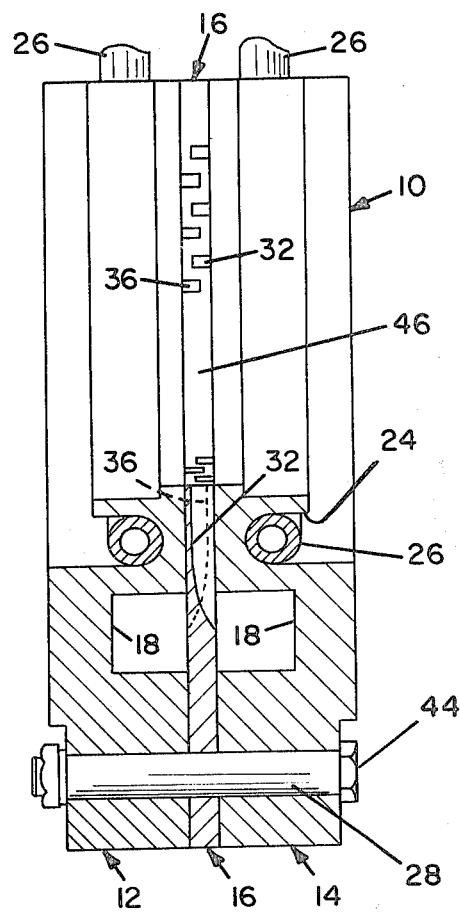
FIG. 4 is a cross-sectional view of the instant torch.

FIG. 4 is a cross-sectional view of the torch 10 taken along 3—3 as shown in FIG. 3. It can be clearly seen that the planar nozzle plate 16 separates the two plenums 18—18 and that the radial grooves 32 and 36 are of a length sufficient to communicate from the arcuate outer surface 46 (also see FIG. 3) of the torch 10 to the plenums 18—18 of members 12 and 14, respectively.

Figure 5:
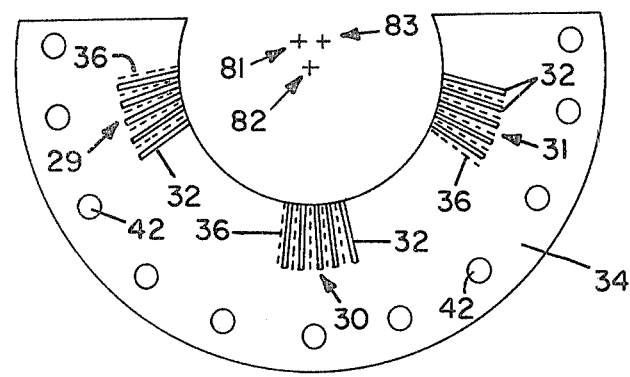
FIG. 5 is a plan view of a major surface of the plate used in the instant torch.

FIG. 5 shows a side view of an exemplary nozzle plate 16. All of the interleaved grooves 32 and 36 in groups 29 and 29' are radially directed at common line 81 while the slots in groups 30, 30' and 31, 31' are radially directed at the common lines 82 and 83, respectively. Common line 82 is on the centerline of the tube 90 while common lines 81 and 82 are on the outer surface of the tube. Although each of the three groups are directed towards different common lines in the exemplary embodiment it may be advantageous to direct the grooves of several groups at the same common line when the number of groups or the size of the tube increases.

Figure 6:
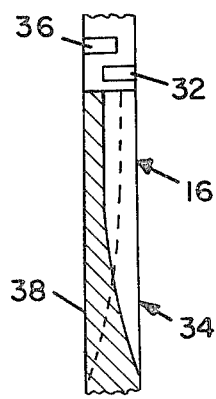
FIGS. 6 to 8 depict various arrangements of the grooves in the planar plate of the instant torch.
Figure 7:
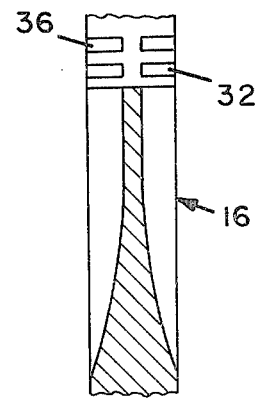
Figure 8:
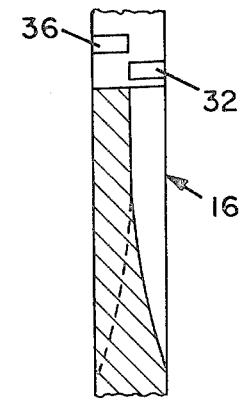

Although, in the exemplary embodiment the grooves 32 and 36 are interleaved as shown in FIG. 6, other arrangements such as aligned grooves (FIG. 7) or offset grooves (FIG. 8) can be effectively used depending on the gases used, surface mixing required, dense temperature, etc.

In operation (see FIGS. 3 and 4), oxygen is directed into the plenum 18 of the outer member 12 via the conduit 22 while hydrogen is urged into the plenum 18 of the outer member 14 via conduit 22. The oxygen and hydrogen gases will pass from the plenums 18—18 and exit through the grooves 32 and 36, respectively, as alternating jets (see FIGS. 4 and 5). The gases will mix at the surface of the torch 10 and are ignited to form an arcuate flame. Advantageously, by using spaced groups of interleaved grooves 32 and 36 the resulting heat zone is substantially narrower than provided in the aforementioned U.S. Pat. No. 4,401,267. Thus, a rotating glass tube 90, shown in phantom in FIG. 3, may then be positioned within the flame to form the desired narrow collapsed region 5 shown in FIG. 1. This may be accomplished with the tube 90 horizontal (see FIG. 3) or vertical (see FIG. 1).

A coolant, such as water, may be passed through the tube 26, as indicated by the arrows, to maintain the temperature of the arcuate surface 46 low enough to prevent oxides from forming on the surfaces thereof. Although the instant embodiment makes use of a coolant tube 26, various other techniques, such as internal cooling channels, and may be used.

The instant torch 10 is efficient and relatively inexpensive to fabricate. Additionally, the torch 10 may be repaired simply by replacing any of the three basic components (i.e., the outer members 12 and 14 and the nozzle plate 16). Furthermore, the heat zone and flame pressure areas provided by the instant torch 10 may be modified by simply changing the size of the grooves 32 and 36 and/or the thickness of the nozzle plate 16 as well as the number of groups of grooves.

In an exemplary embodiment the dimensions of the grooves 32 and 36 in a 0.125 inch thick nozzle plate 16 are shown in Table I.

TABLE I

| $O_2$ Groove Width | $O_2$ Groove Area (in$^2$) | $H_2$ Groove Width (in) | $H_2$ Groove Area (in$^2$) |
| --- | --- | --- | --- |
| .025 | .042 | .040 | .081 |

Although the exemplary torch uses an oxygen-hydrogen mixture, other gas combinations such as methane, propane or the like can be used. Additionally, the exemplary embodiment depicts the use of three groups of grooves. However, the number of groups and their arcuate spacing may be adjusted to alter the width of the heat zone. The instant torch 10 having three arcuately spaced groups of grooves provided a heat zone having approximately one-half the length (i.e., 1.25" to 2.5") of hot zones generated by the torch shown in U.S. Pat. No. 4,401,267.

It is to be understood that the embodiments described herein are merely illustrative of the principles of the invention. Various modifications may be made thereto by persons skilled in the art which will embody the principles of the invention and fall within the spirit and scope thereof. For instance, the torch 10 is arranged to provide an arcuate surface of approximately 180°, however the arc can be less than or greater than 180° and may be 360° forming an annulus through which a tube 90 may pass.

What is claimed is:

1. A torch, comprising:
    an arcuate plate;
    first and second arcuate outer members arranged such that the plate is captured therebetween;
    each other member having a cavity therein which opens toward the plate; and
    the plate having a plurality of arcuately spaced groups of grooves on each major surface thereof extending from an outer edge thereof to the respective cavities in the outer members, each group of grooves being spaced apart from each other a distance greater than the spacing between individual grooves in each group, and all of the grooves in each group being directed towards a common line that is different than the common line associated with the other groups.

2. The torch as set forth in claim 1, wherein:
    the plate has three groups of grooves therein.

3. The torch as set forth in claim 1, wherein:
    the grooves in the opposed surfaces are interleaved.

4. The torch as set forth in claim 1, wherein:
    the grooves in the opposed surfaces are aligned.

5. The torch as set forth in claim 1, wherein:
    the grooves in the opposed surfaces are offset.

6. The torch as set forth in claim 1, which further comprises:
    cooling means located proximate the outer edge of the plate.

7. A torch, comprising:
    an arcuate plate;
    first and second outer members separated by the plate fixedly mounted therebetween, said plate and outer members having at least one coextensive arcuate surface;
    said first and second outer members having respective plenums therein, each plenum having means for communicating with a gas source; and
    said plate having a plurality of arcuately spaced groups of radial grooves on each major surface thereof which extends from the respective plenums to the arcuate surface of said plate, each said group of radial grooves being spaced apart from each other by a distance greater than the spacing between individual grooves in each said group and all of the grooves in each group being directed to a different common line in space than the other groups.

8. The torch as set forth in claim 7, wherein:
    the plate has a plurality of groups of radial, spaced grooves in one major surface which are arranged in an interleaved relationship with a plurality of radial, spaced grooves on the opposite surface thereof;
    each group of grooves is radially directed at a different point in a space.

9. A method of heating an article comprising the steps of:
    directing gases into first and second plenums, respectively, of a torch, said plenums being separated by an arcuate plate;
    further directing said gases along spaced groups of grooves on each major surface of the plate, wherein the grooves extend from the respective plenums to an outer edge of the plate to form a plurality of groups of gas outlets, each group of grooves being spaced from each other by a distance greater than the spacing between the individual grooves of each group, and the gases passing through the grooves in each group being directed to a different common line in space than the other groups; and igniting the gases from the outlets to heat the article.

10. The method as set forth in claim 9, wherein:
the gas directed into the first plenum is oxygen; and the gas directed into the second plenum is hydrogen.

11. The method as set forth in claim 9, wherein:
the grooves on the opposed major surfaces of the plate are in interleaved relationship.

12. The method as set forth in claim 9, wherein:
the grooves on the opposed major surfaces of the plate are aligned.

13. The method as set forth in claim 9, wherein:
the grooves on the opposed major surfaces of the plate are offset.

14. The method as set forth in claim 7 wherein the article is a glass tube to be heated and collapsed about at least a portion of a lightguide preform.

* * * * *

UNITED STATES PATENT AND TRADEMARK OFFICE
CERTIFICATE OF CORRECTION

PATENT NO. : 4,477,244
DATED : October 16, 1984
INVENTOR(S) : J. R. Nis, C. D. Spainhour It is certified that error appears in the above—identified patent and that said Letters Patent is hereby corrected as shown below:

Column 1, line 50, "to" should read --at--. Column 3, line 31, "surfaces" should read --surface--; line 34, "and may" should read --may--.

In the claims, Column 4, claim 1, line 11, "other" should read --outer--; claim 8, lines 59-61, "thereof;
    each group of grooves is radially directed at a different point in a space." should read
--thereof.--

*Signed and Sealed this*

*Sixteenth* Day of *April 1985*

[SEAL]

*Attest:*

DONALD J. QUIGG

*Attesting Officer*     *Acting Commissioner of Patents and Trademarks*